(12) United States Patent
Deger et al.

(10) Patent No.: US 9,151,392 B2
(45) Date of Patent: Oct. 6, 2015

(54) VALVE FOR PRODUCT-GUIDING PROCESSING PLANT

(71) Applicants: Werner Deger, Kirchheim (DE); Frank Neuhauser, Neresheim (DE)

(72) Inventors: Werner Deger, Kirchheim (DE); Frank Neuhauser, Neresheim (DE)

(73) Assignee: Pentair Südmo GmbH (DE)

( * ) Notice: Subject to any disclaimer, the term of this patent is extended or adjusted under 35 U.S.C. 154(b) by 203 days.

(21) Appl. No.: 13/654,096

(22) Filed: Oct. 17, 2012

(65) Prior Publication Data

US 2013/0099148 A1   Apr. 25, 2013

(30) Foreign Application Priority Data

Oct. 19, 2011   (DE) .......................... 10 2011 116 735

(51) Int. Cl.
*F16K 1/44* (2006.01)
*F16K 25/00* (2006.01)

(52) U.S. Cl.
CPC . *F16K 1/44* (2013.01); *F16K 1/446* (2013.01); *F16K 25/005* (2013.01)

(58) Field of Classification Search
CPC ........... F16K 1/44; F16K 1/443; F16K 1/446; F16K 25/00; F16K 25/005; F16K 29/00; F16K 29/02; F16K 3/0281
USPC ............. 137/242, 244; 15/104.16; 3/242, 244
See application file for complete search history.

(56) References Cited

U.S. PATENT DOCUMENTS

| | | | | |
|---|---|---|---|---|
| 2,341,018 A | * | 2/1944 | Clapp | 137/244 |
| 3,716,069 A | * | 2/1973 | Reynolds | 137/244 |
| 4,497,336 A | * | 2/1985 | Rosaen | 137/244 |
| 5,127,125 A | * | 7/1992 | Skibowski | 15/104.061 |
| 5,996,608 A | * | 12/1999 | Hunter et al. | 137/244 |
| 6,637,452 B1 | * | 10/2003 | Alman | 137/244 |
| 7,891,376 B2 | | 2/2011 | Neuhauser et al. | |
| 2012/0313027 A1 | * | 12/2012 | Welchner et al. | 251/318 |

FOREIGN PATENT DOCUMENTS

| | | |
|---|---|---|
| DE | 6908395 U | 7/1969 |
| DE | 102007038124 A1 | 2/2009 |
| WO | WO 2011029838 A1 * | 3/2011 |

* cited by examiner

*Primary Examiner* — William McCalister
*Assistant Examiner* — Ian Paquette
(74) *Attorney, Agent, or Firm* — St. Onge Steward Johnston & Reens LLC

(57) ABSTRACT

A valve for a product-guiding processing plant comprises a housing, in which a closure member and a closure member seat are arranged. The closure member seat is provided on a cylindrical inner wall of a housing portion of the housing. The closure member has a sealing element, which cooperates in a sealing manner with the closure member seat in a closed position of the closure member. The closure member is displaceable in the direction of a longitudinal axis of the housing between an open position, in which the sealing element is distanced from the closure member seat, and the closed position. The valve comprises a scraper for detaching product residues from the inner wall of the inner cylindrical housing portion, the scraper being arranged ahead of the sealing element, as viewed in the direction of closure of the closure member from the open position into the closed position, and being moved along and against the inner wall of the inner cylindrical housing portion when the closure member is displaced from the open position into the closed position.

11 Claims, 5 Drawing Sheets

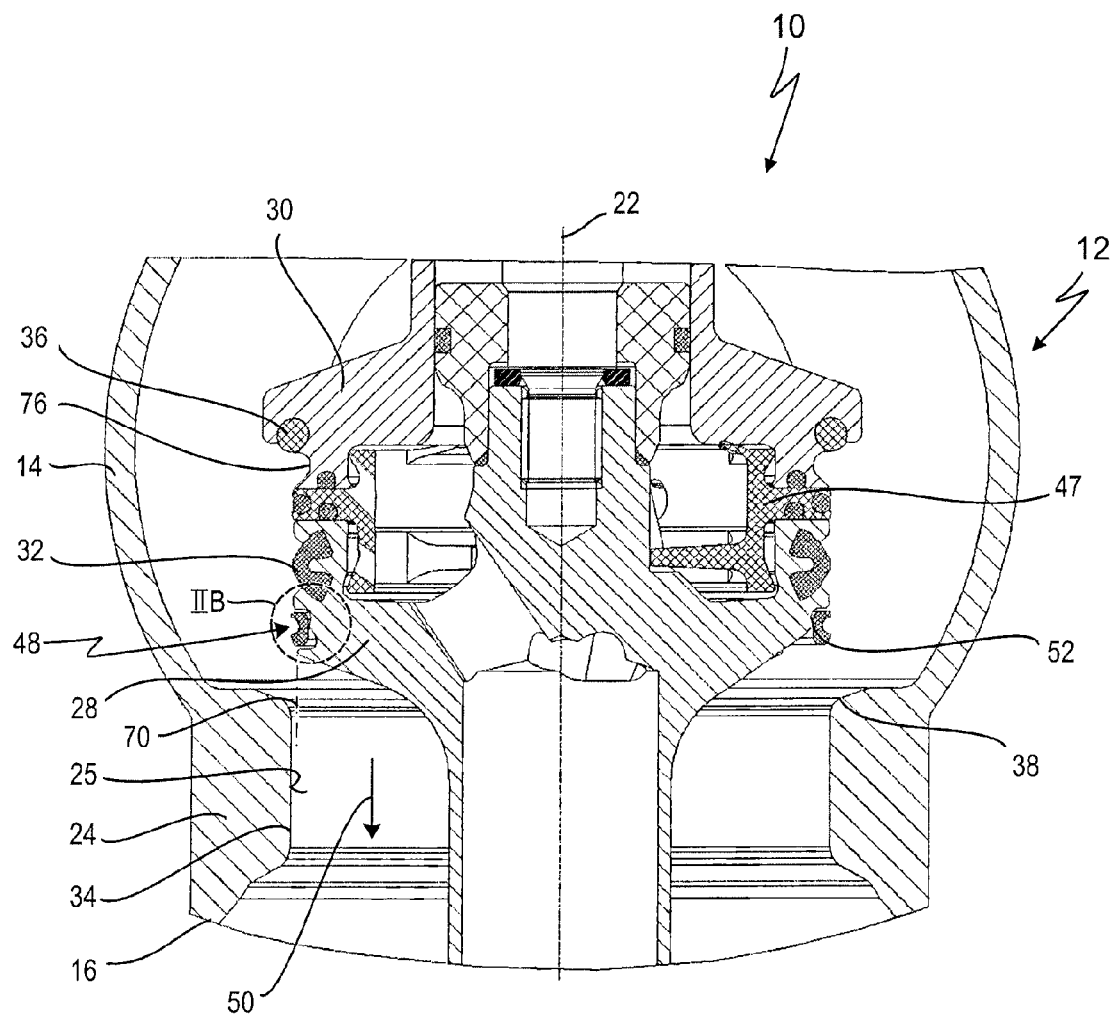
Fig. 2
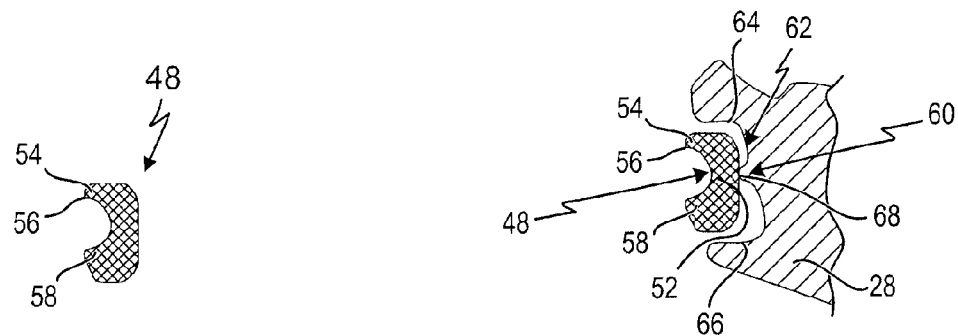
Fig. 2A
Fig. 2B

VALVE FOR PRODUCT-GUIDING PROCESSING PLANT

CROSS REFERENCE TO FOREIGN APPLICATION

This application claims priority from German patent application No. 10 2011 116 735.1 filed on Oct. 19, 2011. The entire contents of this priority application is incorporated herein by reference.

BACKGROUND OF THE INVENTION

The invention generally relates to valves for use in product-guiding plants. More specifically, the invention relates to a valve, comprising a housing, in which a closure member and a closure member seat are arranged. The closure member seat being provided on a cylindrical inner wall of a housing portion of the housing, wherein the closure member has a sealing element, which cooperates in a sealing manner with the closure member seat in a closed position of the closure member. The closure member is displaceable in the direction of a longitudinal axis of the housing between an open position, in which the sealing element is distanced from the closure member seat, and the closed position.

A valve of the type described in the introduction can be used for example in the food processing industry, but also in the chemical industry, in product-guiding processing plants.

A valve according to the invention can be designed as a single seat valve with just one closure member and just one closure member seat, as a double seat valve with two closure members and two closure member seats, or as a double sealing valve with a closure member with two sealing elements spaced in the direction of the longitudinal axis of the housing.

A valve of the type described in the introduction is generally used in a product-guiding processing plant to separate two pipelines from one another in the closed position of the closure member, such that no product can pass from the one pipeline into the other pipeline, or to interconnect the two pipelines in a product-guiding manner in the open position of the closure member. In the open position of the closure member, product flows from one pipeline, through the valve housing, past the closure member and closure member seat, and into the other pipeline.

Within the meaning of the present invention, "product" is not only understood to mean an end product, but also preliminary stages of products or components of products or ingredients, which are processed to form a finished product.

If such a product-guiding processing plant is used in a brewery for example, water, yeast, wort, green beer or finished beer for example may flow through the pipelines.

If such a product-guiding processing plant is used in a dairy for example, milk, fruit preparations, yoghurt, milk-based beverage preparations and the like may flow through the plant.

If the product-guiding processing plant is used in a facility, for example for producing finished soups and the like, products containing not only liquid, but also solid material, flow through the pipelines of the processing plant accordingly.

An example of a product-guiding processing plant in the chemical industry is a plant for producing paints or varnishes for example.

When operating a valve of the type described in the introduction in a product-guiding processing plant, it has been found that product residues may deposit on the cylindrical inner wall of the housing portion, in which the at least one closure member seat is provided. In particular when the valve is used in a product-guiding processing plant of a milk processing facility, it has been found that product residues that tend to harden in a gypseous manner and adhere relatively firmly to the inner wall of the cylindrical housing portion deposit on the cylindrical inner wall of the housing portion. When the closure member is transferred into the closed position, the sealing element may not be able to detach or push aside the product residues depending on the strength of the attachment of the product residues to the cylindrical inner wall of the housing portion, but instead the sealing element runs over the adhering product residues. As the sealing element is moved along the cylindrical inner wall of the housing portion, the sliding friction of the sealing element along the cylindrical inner wall of the housing portion thus increases disadvantageously, and the movement of the sealing element over the product residues disadvantageously leads to quicker wear of the sealing element. If the product residues are located in the region of the closure member seat, the sealing effect of the sealing element at the closure member seat is also reduced, and therefore the valve may exhibit leaks even when the sealing element is not yet worn.

With a known valve according to DE 10 2007 038 124 A1, no measures are taken to remedy this problem.

SUMMARY OF THE INVENTION

It is an object of the invention to improve a valve for a product-guiding plant, such that the service life of the sealing element of the closure member and/or the functional reliability of the valve is/are increased.

According to an aspect of the invention, a valve for a product-guiding processing plant is provided, comprising a housing having a housing portion having a cylindrical inner wall, and having a longitudinal axis; a closure member arranged in the housing and being displaceable in direction of the longitudinal axis of the housing in a direction of closure between an open position and an closed position; a closure member seat arranged on the cylindrical inner wall of the housing portion; a sealing element arranged on the closure member that cooperates in a sealing manner with the closure member seat in the closed position of the closure member, and is distanced from the closure member seat in the open position of the closure member; a scraper arranged ahead of the sealing element, as viewed in direction of closure of the closure member from the open position into the closed position, the scraper being moved along and in contact with the cylindrical inner wall of the housing portion when the closure member is displaced from the open position into the closed position, for detaching product residues from the cylindrical inner wall of the housing portion.

With the valve according to the invention, a measure is taken in a constructionally simple manner by means of the scraper to remove product residues from the cylindrical inner wall of the housing portion, preferably when the valve is being closed. By means of the scraper provided in accordance with the invention, product residues adhering to the cylindrical inner wall of the housing portion, and in particular even those that are dried onto said inner wall, can be reliably detached. Deposits are then preferably stripped or scraped from the cylindrical inner wall of the housing portion each time the valve is transferred from its open position into the closed position, that is to say when the closure member is displaced from its open position into its closed position. Since, in accordance with the invention, the scraper is arranged ahead of the sealing element of the closure member as viewed in the direction of closure of the closure member, the sealing element can slide over the cylindrical inner wall of the housing portion without increased resistance caused by attached product residues, without the sealing element running over the product residues and thus experiencing increased sliding friction. The closure member seat, with which the sealing element cooperates in a sealing manner in the direction of closure of the closure member, is also freed from product residues, at least in part, by the scraper going ahead, whereby the sealing effect of the sealing element is not impaired by product residues. The service life of the sealing element of the closure member of the valve according to the invention is thus increased, and the functional reliability of the valve is also improved.

It goes without saying that the term "scraper" is to be understood generally within the meaning of the present invention, and that the term "scraper" is also to be understood to mean a stripper or a rasper. The hardness and material of the scraper are selected such that the scraper is able to detach or to remove product residues as effectively as possible, but in such a way that it does not damage the cylindrical inner wall of the housing portion, and in particular does not work into the material of the inner wall.

In a preferred embodiment, the scraper is designed as a one-piece ring extending over the entire circumference about the longitudinal axis.

This measure has the advantage that it is possible to provide the scraper and implementation thereof into the valve in a manner that is very simple in terms of construction and is therefore cost effective.

In a further preferred embodiment, the scraper is arranged on the closure member.

In this case, it is advantageous that no separate displacement mechanism has to be provided for the scraper, because the scraper is entrained when the closure member is displaced from the open position into the closed position. As a result, the constructional complexity of the valve according to the invention is not increased by the scraper.

In a further preferred embodiment, the scraper has a lip, which, in a longitudinal section parallel to the longitudinal axis, tapers radially outwardly to form an edge.

The lip of the scraper tapering to form an edge detaches the product residues with displacement of the scraper along the cylindrical inner wall of the housing portion. A particularly effective removal of the product residues is enabled as a result of the lip designed to be tapering to form an edge or tapering in a scraper-like manner.

In conjunction with the previously mentioned measure, the edge points slightly in the direction of closure of the closure member from the open position into the closed position.

This measure advantageously contributes to an increase in the detaching effect of the scraper, because the edge pointing slightly in the direction of closure of the closure member engages between the inner wall and the product residues in the manner of a wedge, and the product residues are peeled off to a certain extent.

In a further preferred embodiment, the lip is a first lip and the scraper has a second lip, which is spaced from the first lip in the direction of the longitudinal axis and is arranged ahead of the first lip, as viewed in the direction of closure of the closure member from the open position into the closed position.

This measure has the advantage that the two-lipped embodiment of the scraper leads to a yet further improved stripping action of the scraper, the second lip already partially detaching or at least attacking the product residues, and the trailing first lip then at least approximately completely removing the product residues. It goes without saying that the scraper can also be designed with more than two lips.

As is yet to be discussed in greater detail further below, the second lip has yet another function in a preferred further embodiment.

The second lip preferably tapers, in a longitudinal section parallel to the longitudinal axis, radially outwardly.

The second lip may likewise taper to form an edge, which preferably points in the direction of opening of the closure member such that the second lip provides particularly effective detachment of product residues when the closure member is opened.

In a further preferred embodiment, the scraper can be tilted radially outwardly from its position in the open position of the closure member.

This measure has the advantage that the at least one lip of the scraper presses against the inner wall of the cylindrical housing portion and can thus engage particularly closely with the product residues so as to detach and remove them.

In a measure that is particularly constructionally simple and that is characterized by a low level of complexity when assembling the scraper, the scraper is received in a groove formed in the outer circumference of the closure member.

In this case, it is further preferable for the groove to have a groove base, which has an axially limited protrusion between its axial ends, such that the scraper is supported in the groove in a rocking manner.

This measure constitutes a particularly constructionally simple measure for mounting the scraper tiltably as described above, so as to thus allow the at least one lip of the scraper to effectively contact the cylindrical inner wall of the housing portion.

In this case, it is further preferred if the first lip tilts radially outwardly when the second lip contacts the cylindrical inner wall of the housing portion.

As a result of this measure, a tilting mechanism for the scraper is created in a particularly constructionally simple manner. If the second lip contacts the cylindrical inner wall of the housing portion, the second lip is pressed radially inwardly, and in doing so the first lip is tilted radially outwardly as a result of the rocking support of the scraper. To this end, the second lip has a corresponding overhang beyond the groove opening so as to enable a sufficient tilting of the scraper.

In accordance with a further preferred embodiment, the scraper consists at least in part of a hard, non-metal material, and in particular of PEEK (polyether ether ketone).

In a further preferred embodiment, the closure member is a first closure member and the first closure member seat is a first closure member seat, a second closure member and a second closure member seat being arranged in the housing, said second closure member seat being spaced from the first closure member seat in the direction of the longitudinal axis, and the second closure member being arranged behind the first closure member, as viewed in the direction of closure of the first closure member from the open position into the closed position.

In accordance with this embodiment, the scraper is thus arranged on the side of the sealing element of the first closure member remote from the second closure member. From the open position, the scraper thus runs ahead of all other moving parts, in particular all provided sealing elements, when the valve is closed, such that these can slide along a cleaned inner wall of the cylindrical inner housing during the closure process so that the sliding movement of any sealing element that has to slide along the cylindrical inner wall of the housing portion during the closure process is not impaired by product residues and therefore is not subject to increased wear.

In conjunction with the aforementioned measure, the second closure member has a sealing element that cooperates in a sealing manner with the second closure member seat in the closed position of the second closure member, the second closure member having a radially inwardly extending concavity, which is adjacent to the sealing element of the second closure member in direction towards the first closure member.

This measure is advantageous in particular if the sealing element of the second closure member is an axial sealing element or an axial/radial sealing element, which cooperates in a sealing manner with a closure member seat at an axial end of the cylindrical housing portion. Specifically, it may be in this position that the scraper cannot completely remove adhering product residues. If the sealing element of the second closure member then comes into contact with the second closure member seat, product residues still adhering there can be forced into the concavity in the second closure member, whereby the sealing effect of the sealing element of the second closure member also is not impaired by product residues.

Further advantages and features will emerge from the following description and the accompanying drawing.

It goes without saying that the features described above and those yet to be described below can be used not only in each of the combinations disclosed, but also in other combinations or individually, without departing from the scope of the present invention.

BRIEF DESCRIPTION OF THE DRAWINGS

An exemplary embodiment of the invention is illustrated in the drawings and will be described in greater detail hereinafter with reference to said drawings, in which:

FIG. 2 shows a detail of the valve in FIG. 1 in a development according to the invention, enlarged compared to FIG. 1 and in longitudinal section, in an operating position of the valve;

FIG. 2A shows a section along line IIA-IIA in FIG. 5;

FIG. 2B shows an enlarged detail according to line IIB in FIG. 2;

DETAILED DESCRIPTION OF A PREFERRED EXEMPLARY EMBODIMENT

Figure 1:
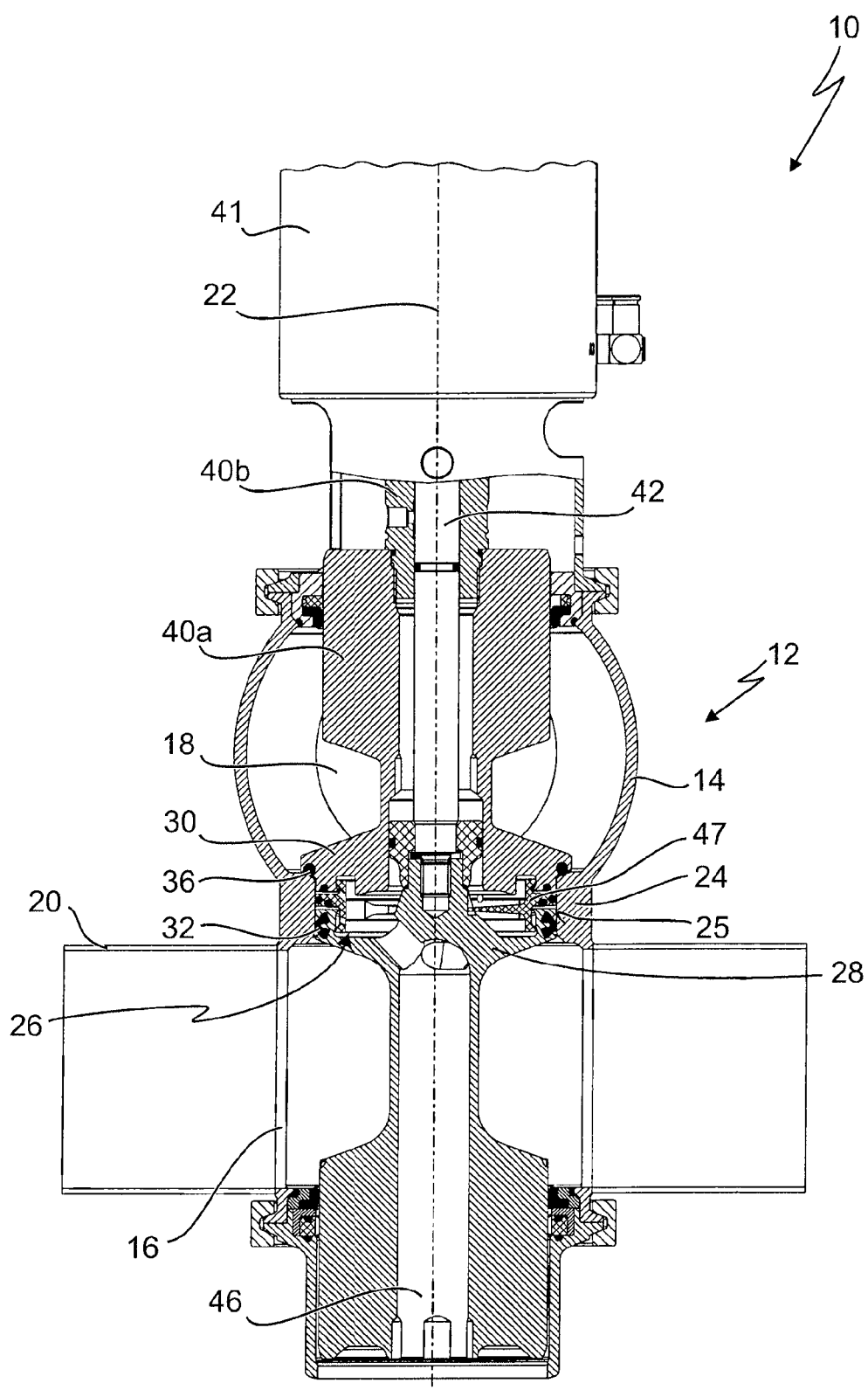
FIG. 1 shows an overview of a valve for a product-guiding processing plant, partly in longitudinal section.
Figure 3:
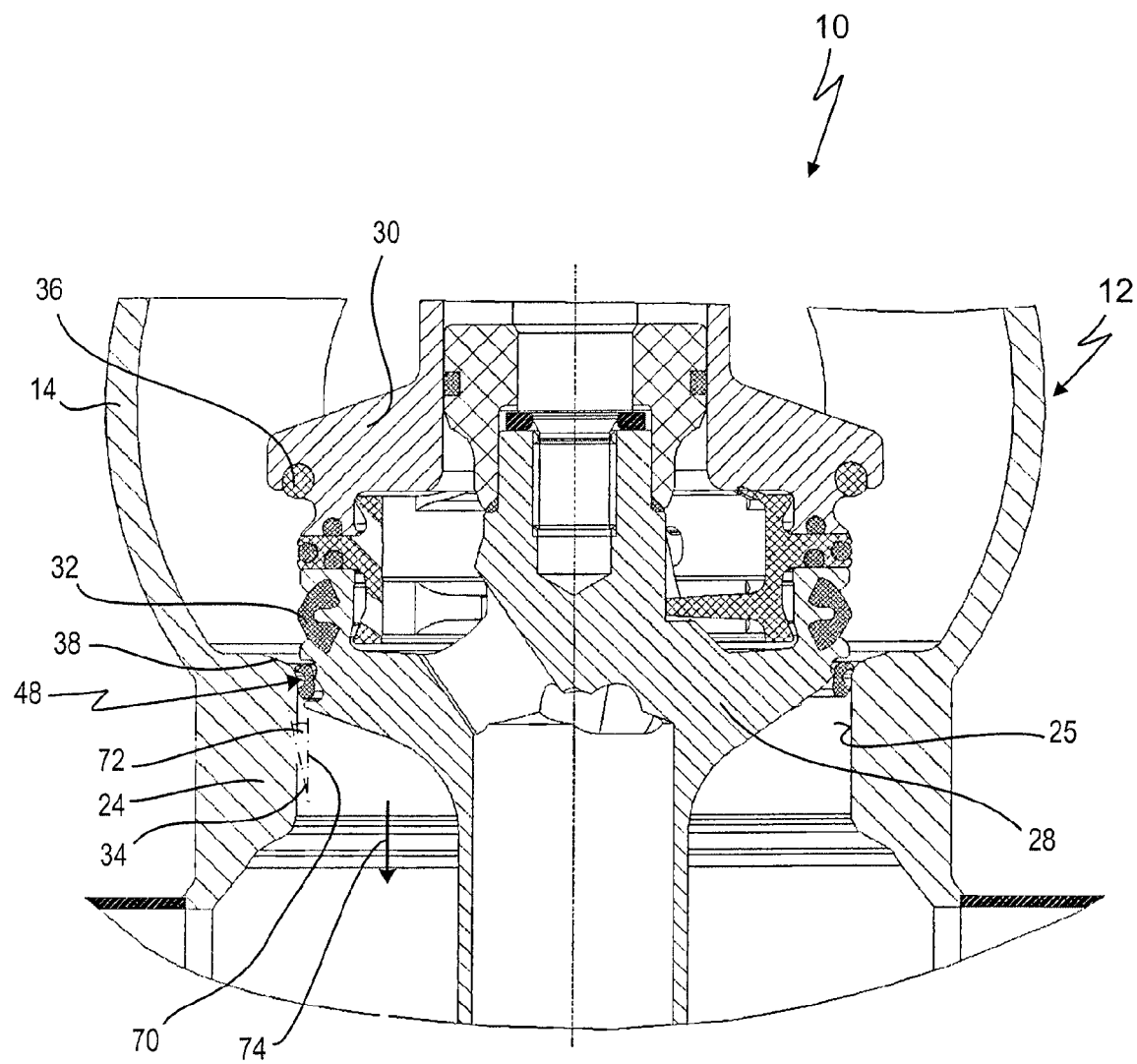
FIG. 3 shows the detail in FIG. 2 in a further operating position of the valve.
Figure 4:
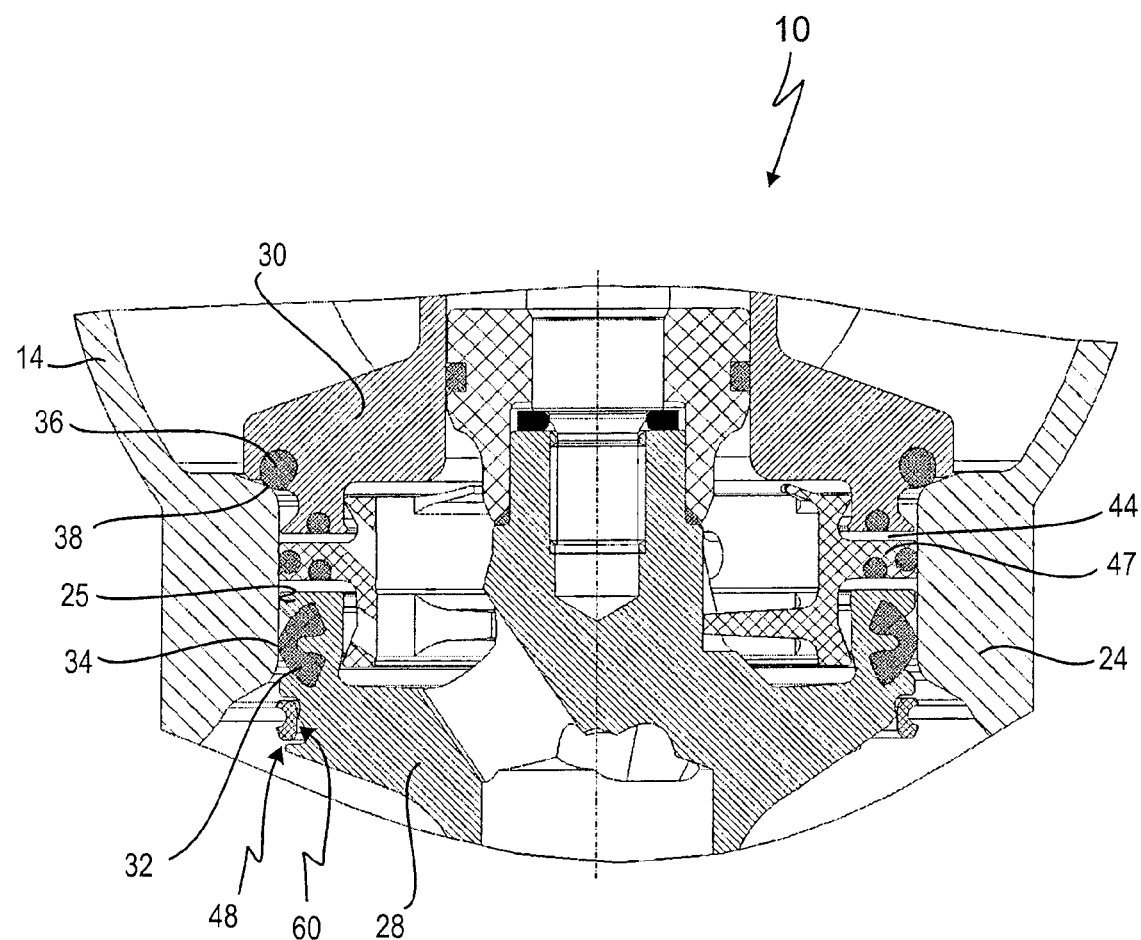
FIG. 4 shows the detail in FIG. 2 in a yet further operating position of the valve.

FIG. 1 illustrates a valve provided with the general reference sign 10 for a product-guiding processing plant. The valve 10 is designed as a double seat valve in the embodiment shown. FIGS. 2 to 4 show details of the valve 10 in a development according to the invention, which is not illustrated in FIG. 1.

The valve 10 is used in a food processing plant for example, in particular in a milk processing facility or in a dairy.

The valve 10 has a housing 12, which has a first housing portion 14 and a second housing portion 16. A first connection piece 18 is arranged on the first housing portion 14 for connection of a first pipeline (not illustrated) to the valve 10, and a second connection piece 20 is arranged on the second housing portion 16 for connection of a further pipeline (not illustrated) to the valve 10, the connection pieces 18 and 20 being arranged, in the exemplary embodiment shown, offset from one another by 90° with respect to a longitudinal axis 22 of the housing 12. In the present description, the longitudinal axis 22 defines the axial direction of the valve 10 and its parts. In this case, "axial" is understood to mean "in the direction of the longitudinal axis 22".

Between the first housing portion 14 and the second housing portion 16, the housing 12 has a housing portion 24, of which the inner wall 25 is cylindrical. The housing portion 24 inwardly defines a connection opening 26, via which the interiors of the housing portions 14 and 16 communicate with one another in the open position of the valve 10, as is illustrated in FIG. 2.

A first closure member 28 and a second closure member 30 are arranged in the housing 12. The first closure member 28 has a sealing element 32, which cooperates in a sealing manner with a first closure member seat 34 (see FIG. 2) in the closed position of the closure member 28 according to FIGS. 1 and 2, the first closure member seat 34 being arranged in the region of a lower end of the housing portion 24 of the housing 12. The second closure member 30 likewise has a sealing element 36, which cooperates in a sealing manner with a second closure member seat 38 (see FIG. 2) when the second closure member 30 is located in its closed position, as is illustrated in FIGS. 1 and 4.

The second closure member 30 is connected to a drive element 40a, 40b, the drive element 40a, 40b being connected to a control mechanism 41 (not illustrated in greater detail), which is known per se, to axially displace the closure member 30. The first closure member 28 is likewise connected to a drive element 42, which is connected to the control mechanism 41 to axially displace the closure member 28.

A leakage space 44 (see FIG. 4) is located between the first closure member 28 and the second closure member 30 and is used, in the closed state of the valve 10 according to FIGS. 1 and 2, to enable a discharge of leakages if one or both of the sealing elements 32, 36 exhibits leaks, so as to detect a leakage state. To this end, the leakage space 44 is connected to a leakage outlet 46. The leakage outlet 46 is formed by a tubular continuation of the first closure member 28.

A flow barrier element 47, of which the function is linked to the cleaning of the valve 10, is located in the leakage space 44. Specifically, when the valve 10 is cleaned, the first closure member 28 or the second closure member 30 is opened so as to introduce a cleaning medium into the leakage space 44. Whilst one of the two closure members 28 or 30 remains in its closed position during this process, the flow barrier element 46 prevents the cleaning medium introduced past the opened closure member 28 or 30 from being applied directly to the closure member 28 or 30 located in the closed position.

A development according to the invention of the valve 10 in FIG. 1 will now be described with reference to FIGS. 2 to 4.

FIG. 2 shows the valve 10 in its open position, in which the first closure member 28 and the second closure member 30 are displaced away from their closure member seat 34 and 38 respectively so that the sealing element 32 of the first closure member 28 and the sealing element 36 of the second closure member 30 are removed from the respective closure member seat 34 and 38 respectively. In this open position of the valve 10, the interiors of the housing portions 14 and 16 communicate with one another so that a product can pass from the interior of the housing portion 14 into the interior of the housing portion 16 or vice versa. The pipeline (not illustrated) connected to the connection piece 16 and the pipeline (not illustrated) connected to the connection piece 18 are thus interconnected in this open position in a product-conveying manner. Depending on the product guided through the valve 10, it may be that, after a specific period of time, over which the two closure members 28 and 30 remain in their open position illustrated in FIG. 2, product residues deposit on the inner wall 25 of the housing portion 24. In the case of milk-based products, these may sometimes dry and form a gypseous coating over the inner wall 25 of the housing portion 24. Such product residues attached to the inner wall 25 of the housing portion 24 may result in the sealing element 32 running along these product residues with increased sliding friction, as the valve 10 is closed from the operating position shown in FIG. 2 into the operating position shown in FIG. 4, until reaching the closure member seat 34, without being able to push these residues aside. This may lead to quicker wear of the sealing element 32. In addition, it may be that the sealing element 32 can no longer cooperate in a completely sealing manner with the closure member seat 34 in the closed position of the first closure member 28 due to the product residues attached in the region of the closure member seat 34.

To provide a solution herein to the above-described technical problem, the valve 10 has a scraper 48 for detaching product residues from the inner wall 25 of the housing portion 24. The scraper 48 is, in this case, arranged ahead of the sealing element 32 in a direction of closure, indicated by an arrow 50, of the closure member 28 from the open position shown in FIG. 2 into the closed position shown in FIG. 4. The scraper 48 thus always contacts the inner wall 25 of the housing portion 24 before the sealing element 32 of the closure member 28 when the closure member 28 is closed, and the scraper 48 removes product residues from the inner wall 25 during the movement in the direction of the arrow 50 along the inner wall 25.

According to FIG. 4, the scraper 48 is arranged with respect to the inner wall 25 such that the scraper 48 no longer contacts the inner wall 25 in the closed position of the closure member 28 according to FIG. 4, although this does not necessarily have to be the case.

Figure 5:
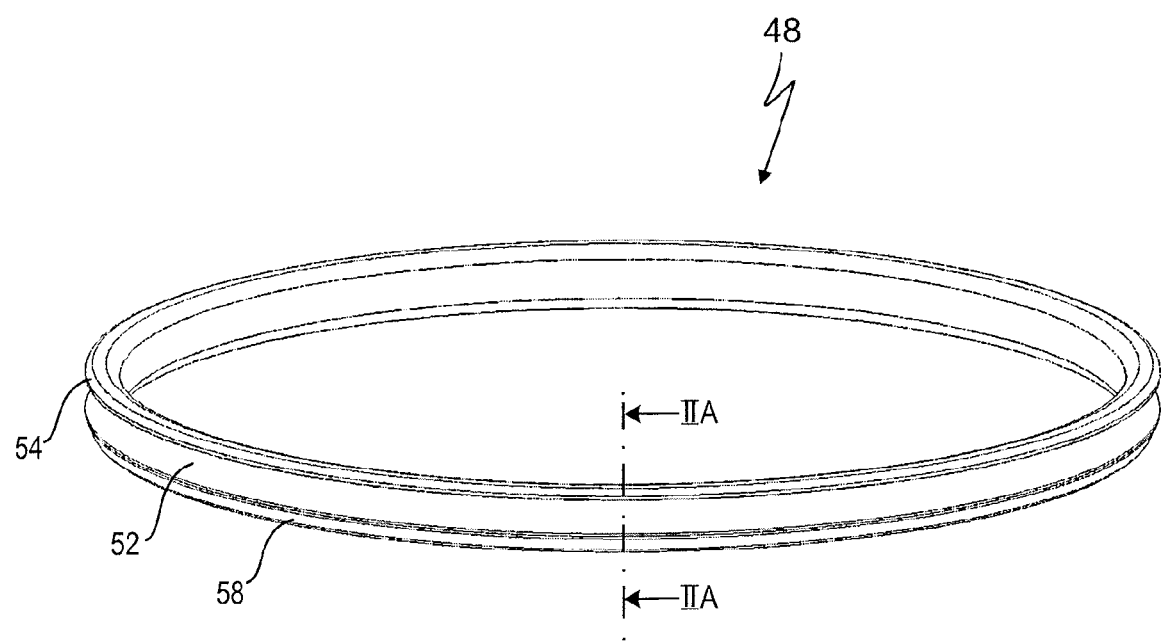
FIG. 5 shows a detail of the valve according to FIGS. 2 to 4, alone in a perspective view.

The scraper 48 is designed as a one-piece ring 52 extending over the entire circumference about the longitudinal axis 22, as is shown in FIG. 5.

The scraper 48 has a first lip 54, which, in accordance with FIG. 2A, tapers, in a longitudinal section parallel to the longitudinal axis 22, radially outwardly to form an edge 56. The edge 56 points slightly in the direction of closure (arrow 50) of the closure member 28 from the open position into the closed position.

The scraper 48 further has a second lip 58, which is spaced from the first lip 54 in the direction of the longitudinal axis 22 and is arranged upstream of the first lip 54, as viewed in the direction of closure of the closure member from the open position into the closed position. The second lip 58 tapers radially outwardly parallel to the longitudinal axis in longitudinal section.

The scraper 48 is arranged on the first closure member 28 in the exemplary embodiment shown, the first closure member 28 having a groove 60 for this purpose. In FIG. 2B, the groove 60, together with the scraper 48 inserted therein, is illustrated in longitudinal section parallel to the longitudinal axis 22 in an enlarged manner compared to FIGS. 2 to 4. The groove 60 has a groove base 62, which has an axially defined protrusion 68 between its axial ends 64 and 66 so that the scraper 48 is supported in the groove 60 in a rocking manner. The rocking support of the scraper 48 in the groove 60 causes the scraper 48 to be tilted out from an axis 70, starting from its position in FIG. 2 (open position of the closure member 28), by an angle 72 when the second lip 58 contacts the inner wall 25 of the housing portion 24, as is illustrated in FIG. 3. In doing so, the second lip 58 is specifically pressed radially inwardly, and the first lip 54 is moved radially outwardly as a result of the rocking support of the scraper 48, whereby the edge 56 of the first lip 54 closely contacts the inner wall 25 of the housing portion 24. The edge 56 of the first lip 54 can thus very effectively detach or scrape off product residues attached to the inner wall 25 if, with continued closure, the first closure member 28 is moved axially along the inner wall 25 starting from FIG. 3 in the direction of an arrow 74 until the sealing element 32 has reached the closure member seat 34, as is illustrated in FIG. 4.

The scraper 48 consists at least in part of a hard, non-metal material, and in particular of PEEK.

In accordance with FIGS. 2 to 4, the second closure member 30 is arranged behind the first closure member 28 in the direction of closure of the first closure member 28 from the open position into the closed position. The scraper 48 is thus trailed by the second closure member 30 during the transition from the open position of the second closure member 30 into its closed position, whereby all sealing elements coming into contact with the inner wall 25 of the housing portion 24 come into contact with the inner wall 25 in the cleaned state, or at least in a state in which the product residues are loosened to such an extent that the sealing elements can push aside the product residues.

Since the closure member seat 38 is arranged on a wall portion of the housing portion 24 not extending parallel to the longitudinal axis 22, the scraper 48 may not detach, or may not completely detach, product deposits located on the closure member seat 38. So as to ensure a reliable, sealing contact of the sealing element 36 at the closure member seat 38, even in this instance, the second closure member 30 has a radially inwardly extending concavity 76, which is adjacent to the sealing element 36 of the second closure member 30 in the direction of the first closure member 28. The sealing element 36 can force a product residue at the closure member seat 38 into the concavity 76, whereby a reliable, sealing contact between the sealing element 36 and the closure member seat 38 is ensured.

Whilst the valve 10 according to the exemplary embodiment shown is an upwardly opening valve, that is to say the closure members 28 and 30 are displaced upwardly to transfer the valve 10 from the closed position shown in FIGS. 1 and 4 into the open position shown in FIG. 2, the invention can also be applied however with a valve in which the provided closure members open downwardly. The scraper 48 is then also to be arranged such that it is ahead of the sealing elements during the transition from the open position into the closed position, that is to say the scraper 48 would not be arranged at the lower end of the arrangement formed of the first closure member 28 and second closure member 30, as in the exemplary embodiment shown, but in the region of the upper end.

What is claimed is:

1. A valve for a product-guiding processing plant, comprising
    a housing having a housing portion having a cylindrical inner wall, and having a longitudinal axis;
    a closure member arranged in the housing and being displaceable in direction of the longitudinal axis of the housing in a direction of closure between an open position and an closed position;
    a closure member seat arranged on the cylindrical inner wall of the housing portion;
    a sealing element arranged on the closure member that cooperates in a sealing manner with the closure member seat in the closed position of the closure member, and is distanced from the closure member seat in the open position of the closure member;

a scraper arranged ahead of the sealing element, as viewed in direction of closure of the closure member from the open position into the closed position, the scraper being moved along and in contact with the cylindrical inner wall of the housing portion when the closure member is displaced from the open position into the closed position, for detaching product residues from the cylindrical inner wall of the housing portion;

wherein the scraper is tiltable radially outwardly from a rest position in the open position of the closure member;

wherein the scraper has a lip, which, in a longitudinal section parallel to the longitudinal axis, tapers radially outwardly to form an edge;

wherein the lip is a first lip, and the scraper has a second lip, which is spaced from the first lip in direction of the longitudinal axis and is arranged ahead of the first lip, as viewed in the direction of closure of the closure member from the open position into the closed position;

wherein the first lip tilts radially outwardly when the second lip contacts the cylindrical inner wall of the housing portion.

2. The valve of claim 1, wherein the scraper is designed as a one-piece ring extending over an entire circumference of the cylindrical inner wall about the longitudinal axis.

3. The valve of claim 1, wherein the scraper is arranged on the closure member.

4. The valve of claim 1, wherein the edge points slightly in the direction of closure of the closure member from the open position into the dosed position.

5. The valve of claim 1, wherein the second lip tapers, in a longitudinal section parallel to the longitudinal axis, radially outwardly.

6. The valve of claim 1, wherein the scraper consists at least in part of a hard, non-metal material.

7. The valve of claim 1, wherein the scraper consists of PEEK.

8. The valve of claim 1, wherein the scraper is seated in a groove formed in an outer circumference of the closure member.

9. The valve of claim 8, wherein the groove has a groove base, which has an axially limited protrusion between axial ends of the groove, such that the scraper is supported in the groove in a rocking manner.

10. The valve of claim 1, wherein the closure member is a first closure member and the closure member seat is a first closure member seat, a second closure member and a second closure member seat being arranged in the housing, said second closure member seat being spaced from the first closure member seat in direction of the longitudinal axis, and the second closure member being arranged behind the first closure member, as viewed in direction of closure of the first closure member from the open position into the closed position.

11. The valve of claim 10, wherein the second closure member has a sealing element that cooperates in a sealing manner with the second closure member seat in the closed position of the second closure member, the second closure member having a radially inwardly extending concavity, which is adjacent to the sealing element of the second closure member in direction towards the first closure member.

* * * * *